Oct. 8, 1929.  J. A. McKEE  1,730,519
TRACK FOR DOG RACING AND THE LIKE
Filed July 30, 1928  2 Sheets-Sheet 1
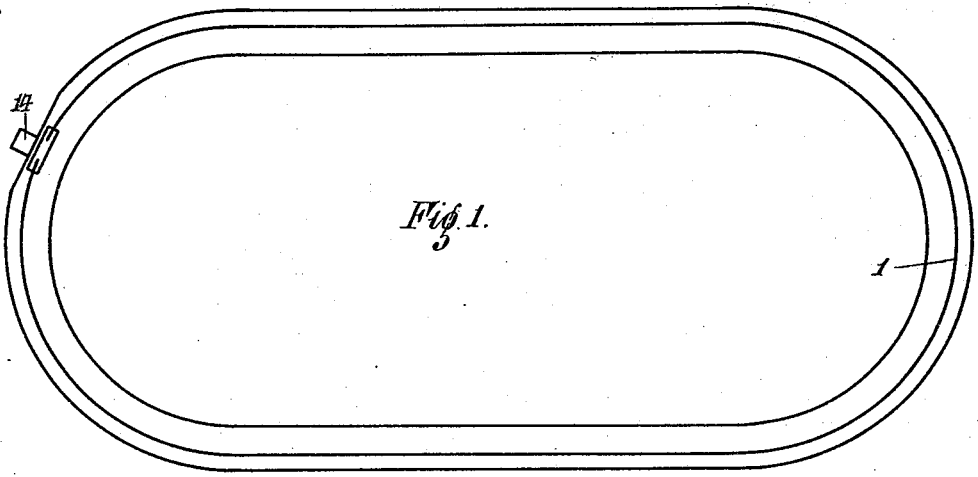
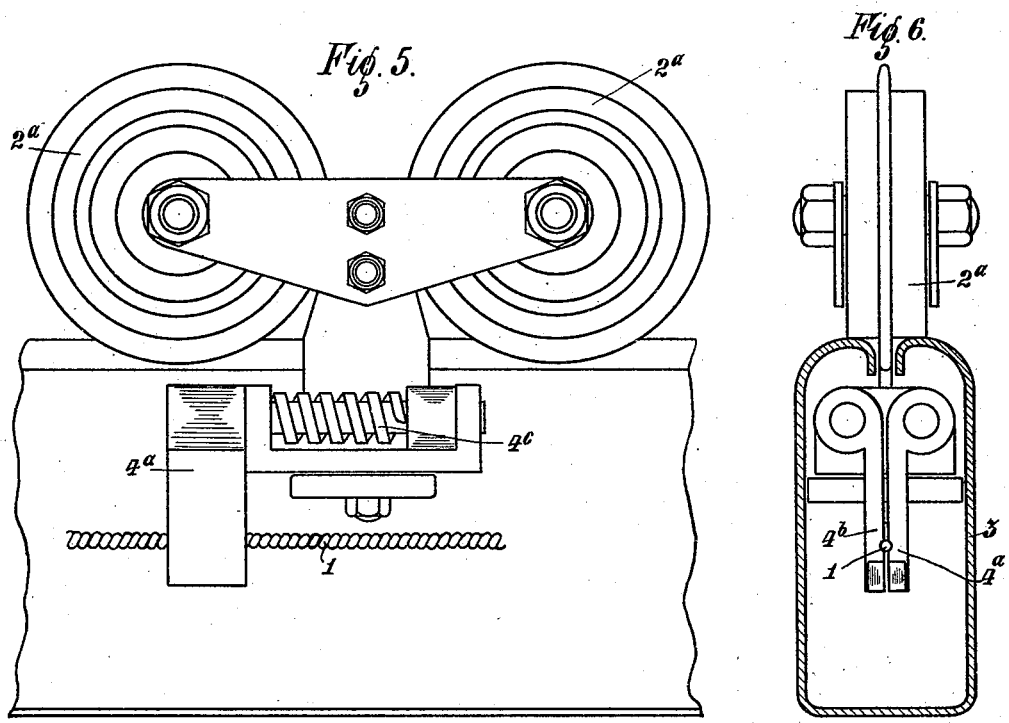

Oct. 8, 1929.    J. A. McKEE    1,730,519
TRACK FOR DOG RACING AND THE LIKE
Filed July 30, 1928    2 Sheets-Sheet 2
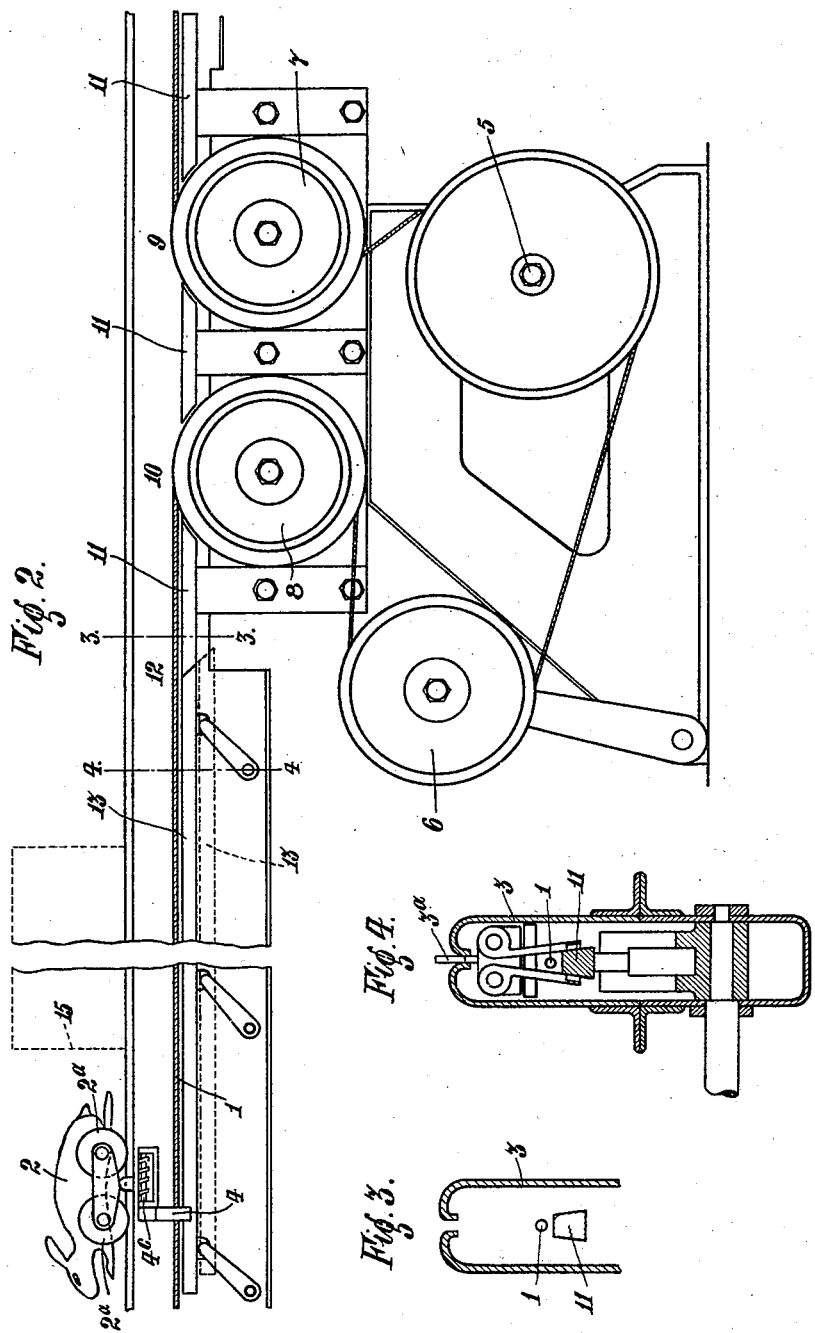

Patented Oct. 8, 1929

1,730,519

UNITED STATES PATENT OFFICE

JAMES ALEXANDER McKEE, OF BELFAST, IRELAND

TRACK FOR DOG RACING AND THE LIKE

Application filed July 30, 1928, Serial No. 296,204, and in Great Britain September 22, 1927.

This invention relates to tracks for dog racing and the like, of the class in which an artificial lure is carried round, or along a track for the dogs to follow and withdrawn from the course, or track, at the end of the race, before the dogs can reach the lure and while they are still chasing the lure at full speed. At present it is usual to carry the artificial lure round, or along the track by a wheeled car, or wheeled bogie running on rails above the ground and under cover, with an arm extending out from the covered railway and supporting the lure which may, or may not, run on an additional rail, or railway. The present arrangements are complicated, costly to make and costly to run and dangerous to the dogs and the object of the present invention is to provide a more simple and more economical arrangement.

According to this invention, the artificial lure is carried round, or along a track by a cable of wire rope, or other suitable material, or a trolley; in either case suitably driven and running below the ground, or track level, the artificial lure running on ground, or track level and preferably provided with means for engaging and disengaging the cable or trolley, so that the lure can be carried along and released when required.

The lure would preferably be made to disappear into a suitable covert, or housing, arranged above the level of the track and in either case means would be provided to release the lure from the cable or trolley when it enters the covert, or housing, and for allowing it to re-engage with the cable or trolley beyond the position where the cable is given its drive, such reengagement being preferably under control so that the lure can be either allowed to pass out again on to the track, or kept in the covert, or housing, as required.

The invention will now be described with reference to the accompanying drawings whereon there is shown, by way of example only, an arrangement of a cable drive for an artificial lure for a dog racing track.

Fig. 1 illustrates diagrammatically the plan of a track and shows the shape of the path round which the cable has to be operated.

Fig. 2 is an elevation showing a portion of the cable where the driving of the cable is effected and also showing the means for releasing the lure from engagement with the cable while the latter is interrupted in its path for the drive to be effected. This view also shows means for keeping the lure out of engagement with the cable when it is required to stop the lure.

Fig. 3 is a cross sectional elevation on the line 3—3, Fig. 2.

Fig. 4 is a cross sectional elevation on the line 4—4, Fig. 2.

Fig. 5 is an elevation of the lure carrier and showing the gripper whereby the lure can be connected with the cable and disconnected therefrom when required.

Fig. 6 is an end elevation of the lure carrier and a section of the casing, or housing, which also forms a rail on which the lure carrier can run.

Referring to the drawings:—

In the example of carrying out the invention as shown on the drawings, the lure carrying cable 1 is moved round a circuitous track as shown in the diagrammatic view, Fig. 1. The cable 1 for carrying the artificial lure 2 round the track is sunk in a casing, or housing 3, the cable 1 being sunk below the level of the track and provided with suitable cable supporting rollers at convenient intervals and especially at the curves. An opening $3^a$ is provided at the top of the cable housing 3, which top preferably, as shown, forms a running rail for rollers $2^a$ on which the artificial lure 2 is supported. The rollers $2^a$ are shown flanged so as to enter the opening $3^a$ of the cable housing, the rollers $2^a$ being connected with a cable gripper 4 comprising two jaws $4^a$ and $4^b$ turnably supported and having each a groove therein so that when the jaws are brought close together, they grip on the cable 1 being forced against the cable by torsion springs $4^c$, the springs $4^c$ being so made and arranged that normally the gripper jaws $4^a$ and $4^b$ will take an effective grip of the cable 1. When required the gripper can be caused to release its hold on the cable 1 at predetermined positions, for example, at the position where the cable 1 is interrupted to effect the drive thereof. The interruption of the continuous path of the cable is shown clearly at Fig. 2, where it will be seen that the cable 1, driven from a driving shaft 5, passes round a tensioning jockey pulley 6 and guide pulleys 7 and 8, before returning to its path, the interruption of the path being from the point 9 to the point 10 between which points the lure must be released from the cable. For this purpose fixed cam bars 11 (see Fig. 2 and also Fig. 3) are provided to force the jaws 4ª and 4ᵇ of the gripper apart and so release their hold on the cable 1. When the gripper 4 has passed the cams 11 it will, normally, re-engage with the cable 1 at the point 12 so that the lure would continue to be carried round the track with almost no interruption of its speed. Should however, it be desired to bring the lure to a stand-still, a cam bar 13 can be brought into line with the cam bars 11 so as to maintain the jaws 4ª and 4ᵇ of the gripper open and out of engagement with the cable for sufficient distance to allow the lure to come to rest. Preferably the lure would come to rest within a suitable housing, or covert. Re-engagement of the lure 2 with the cable 1 would preferably be under control from a control tower, or observation box 14, suitable connections being provided between the box 14 and the movable cam bar 13 for this purpose and so that the lure can be engaged with the cable 1 after passing the driving position. The housing, or covert, into which the lure may be brought immediately after passing the driving position, is shown by the dotted lines 15 in Fig. 2. This housing 15 may be adapted to be lifted up to allow the lure and the dogs unobstructed passage for any circuit, or circuits, but capable of being dropped into position on the track when it is desired that the lure 2 should be brought to rest therein and thus caused to disappear from the view of the dogs. The raising and lowering of the covert or housing 15 would preferably be controlled from the control box, or tower 14. The raising of the covert or housing 15 may be coincident with the reengagement of the lure 2 with the cable 1. The lure 2 may simply disappear into a housing through a suitable door and be released therefrom through a suitable door. The doors may be covered with some suitable soft material to prevent any possible injury to a dog.

The artificial lure 2 carried round or along a track by a cable 1 is described, can have the track undulating to any desired extent and lateral, or side to side movement may also be provided for. The entire apparatus can be much more simply and cheaply constructed and maintained than the present form of electrically driven carriages generally in use for the carrying of an artificial lure round a race track.

Instead of the cable as described with reference to the examples shown on the drawings, a trolley may be used and suitably driven. The trolley would run below the ground or track level and means would be provided for engaging and disengaging the lure from the trolley when required.

I claim :—

1. Apparatus for use in dog racing comprising the combination of a track for the dogs, a tubular housing laid out beneath said track and having a longitudinal slot along the top thereof, a cable running through said housing around the track, an artificial lure, gripper means, means extending through said slot so as to connect said lure and gripper means, driving means whereby said cable is put and kept in motion around the track, and means whereby said gripper means is caused to engage with or be disengaged from said cable automatically.

2. Apparatus for use in dog racing comprising the combination of a track for the dogs, a cable laid out beneath the said track, an artificial lure, driving means whereby said cable is put and kept in motion around the track, gripper means, means connecting said lure and gripper means, spring means whereby said gripper means is caused to engage with said cable, and trip means whereby said cable and gripper means are disengaged.

3. Apparatus for use in dog racing comprising the combination of a track for the dogs, a tubular housing laid out beneath said track and having a longitudinal slot along the top thereof, a cable running through said housing around the track, an artificial lure, a roller carriage having for its running rail the top of said housing, means securing said lure on said carriage, means extending through said slot so as to connect said carriage to the cable, and driving means whereby said cable is put and kept in motion around the track.

4. Apparatus for use in dog racing comprising the combination of a track for the dogs, a cable laid out beneath the said track, an artificial lure, driving means whereby said cable is put and kept in motion around the track, gripper means, means connecting said lure and gripper means, spring means whereby said gripper means is caused to engage with said cable, trip means adapted to disengage said gripper means from said cable, and means whereby said trip means can be moved out of the way of said gripper means so as not to disengage said gripper means from said cable.

5. Apparatus for use in dog racing comprising the combination of a track for the dogs, a cable laid out beneath the said track, an artificial lure, driving means for said cable disposed out of the path of the cable around the track, gripper means adapted to grip said cable, means connecting said lure and gripper means, trip bars in the path of said gripper means adapted to disengage said gripper means where the path of the cable is interrupted to effect the drive, and spring means whereby said gripper means is thereafter re-engaged with the cable automatically.

6. Apparatus for use in dog racing comprising the combination of a track for the dogs, a tubular housing laid out beneath said track and having a longitudinal slot along the top thereof, a cable running through said housing around the track, an artificial lure, a roller carriage having for its running rail the top of said housing, means securing said lure on said carriage, means extending through said slot so as to connect said carriage to the cable, driving means for said cable disposed out of the path of the cable, and means whereby said carriage is disengaged where the path of the cable is interrupted to effect the drive and then re-engaged automatically.

7. Apparatus for use in dog racing comprising the combination of a track for the dogs, a tubular housing laid out beneath said track and having a longitudinal slot along the top thereof, a cable running through said housing around the track, an artificial lure, a roller carriage having for its running rail the top of said housing, means securing said lure on said carriage, gripper means adapted to grip said cable, means extending through said slot so as to connect said lure and gripper means, driving means for said cable disposed out of the path of the cable around the track, trip bars in the path of said gripper means adapted to disengage said gripper means where the path of the cable is interrupted to effect the drive, and torsion spring means whereby said gripper means is thereafter re-engaged with the cable automatically.

8. Apparatus for use in dog racing comprising the combination of a track for the dogs, a cable laid out beneath the said track, an artificial lure, driving means for said cable disposed out of the path of the cable, means connecting said lure to the cable, means whereby said lure is disengaged where the path of the cable is interrupted to effect the drive and then re-engaged automatically, means whereby said lure can be disengaged from said cable in the course of the path thereof around the track, and means whereby said last mentioned means can be rendered inoperative so as not to disengage the lure from the cable.

9. Apparatus for use in dog racing comprising the combination of a track for the dogs, a cable laid out beneath the said track, an artificial lure, driving means for said cable disposed out of the path of the cable, gripper means adapted to grip said cable, means connecting said lure and gripper means, spring means whereby said gripper means is caused to engage with said cable, trip means in the path of said gripper means where the path of said cable is interrupted to effect the drive, additional trip means in the path of said gripper means at a point in the path of the cable around the track, and means whereby said additional trip means can be moved at will out of the way of said gripper means so as not to disengage said gripper means from said cable.

In testimony whereof I affix my signature.

JAMES ALEXANDER McKEE.